United States Patent
Cepress et al.

(10) Patent No.: US 11,436,463 B2
(45) Date of Patent: Sep. 6, 2022

(54) MULTILAYER COMPOSITE BACKED CARD

(71) Applicant: CAPITAL ONE SERVICES, LLC, McLean, VA (US)

(72) Inventors: Carl Alexander Cepress, Mountain View, CA (US); Elwin Ching Yee Ong, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/175,123

(22) Filed: Feb. 12, 2021

(65) Prior Publication Data
US 2021/0166099 A1 Jun. 3, 2021

Related U.S. Application Data

(60) Continuation of application No. 16/446,945, filed on Jun. 20, 2019, now Pat. No. 10,922,602, which is a
(Continued)

(51) Int. Cl.
*G06K 19/077* (2006.01)

(52) U.S. Cl.
CPC ... *G06K 19/07728* (2013.01); *G06K 19/0776* (2013.01); *G06K 19/07722* (2013.01); *G06K 19/07737* (2013.01)

(58) Field of Classification Search
CPC ....... G06K 19/07728; G06K 19/07722; G06K 19/07737; G06K 19/0776
See application file for complete search history.

(56) References Cited

U.S. PATENT DOCUMENTS

| | | | |
|---|---|---|---|
| 1,435,911 | A | 11/1922 | Bechtold |
| 4,897,533 | A | 1/1990 | Lyszczarz |

(Continued)

FOREIGN PATENT DOCUMENTS

| | | |
|---|---|---|
| CN | 201165095 | 12/2008 |
| CN | 101479749 | 7/2009 |

(Continued)

OTHER PUBLICATIONS

I. Mayordomo, T. Dräger, P. Spies, J. Bernhard and A. Pflaum, "An Overview of Technical Challenges and Advances of Inductive Wireless Power Transmission," in Proceedings of the IEEE, vol. 101, No. 6, pp. 1302-1311, Jun. 2013, doi: 10.1109/JPROC.2013. 2243691. (Year: 2013).*
(Continued)

*Primary Examiner* — Matthew Mikels
(74) *Attorney, Agent, or Firm* — Finnegan, Henderson, Farabow, Garrett & Dunner, LLP

(57) ABSTRACT

A transaction card is disclosed. The transaction card may include a first card component of non-plastic card material having a thickness of no more than about 0.3 mm, a second card component of composite fiber material having a thickness of no more than about 0.3 mm, and an adhesive for affixing the first layer and second layer together. The non-plastic card material may be selected from a group including wood, bamboo, steel, copper, aluminum, silver, gold, platinum, granite, marble, and slate and the composite fiber material may include at least one of a glass fiber composite, a carbon fiber composite, or a natural fiber composite.

20 Claims, 5 Drawing Sheets

Related U.S. Application Data division of application No. 15/293,137, filed on Oct. 13, 2016, now Pat. No. 10,402,715.

(60) Provisional application No. 62/241,421, filed on Oct. 14, 2015.

(56) References Cited

U.S. PATENT DOCUMENTS

| | | | |
|---|---|---|---|
| 6,025,283 | A | 2/2000 | Roberts |
| 7,063,265 | B2 | 6/2006 | Fujiki et al. |
| 8,181,880 | B2 * | 5/2012 | Kwon ................ G06K 19/0775 |
| | | | 235/492 |
| 8,251,294 | B2 | 8/2012 | Phillips et al. |
| 8,579,201 | B2 | 11/2013 | Akesson |
| 10,402,715 | B2 * | 9/2019 | Cepress ............ G06K 19/0776 |
| 10,922,602 | B2 * | 2/2021 | Cepress ............ G06K 19/0776 |
| 2003/0125464 | A1 | 7/2003 | Yabui |
| 2006/0292946 | A1 | 12/2006 | Kiekhaefer |
| 2009/0242647 | A1 | 10/2009 | Kim |
| 2010/0276495 | A1 | 11/2010 | Goldstein et al. |
| 2011/0293851 | A1 | 12/2011 | Bollström |
| 2013/0021002 | A1 | 1/2013 | Mayes |
| 2013/0255848 | A1 | 10/2013 | Cox |
| 2013/0287267 | A1 | 10/2013 | Varone |
| 2013/0316148 | A1 | 11/2013 | Gunnink |
| 2015/0178616 | A1 | 6/2015 | Blum |
| 2015/0235122 | A1 * | 8/2015 | Finn ..................... H05K 1/0233 |
| | | | 235/439 |
| 2015/0269477 | A1 | 9/2015 | Finn et al. |

FOREIGN PATENT DOCUMENTS

| | | |
|---|---|---|
| CN | 103854050 | 6/2014 |
| CN | 104781832 | 7/2015 |
| JP | 2016-099762 | 5/2016 |

OTHER PUBLICATIONS

Communication and Search Report, issued from the European Patent Office in corresponding Application No. 16856199.1-1202, dated Apr. 30, 2019 (7 pages).

International Search Authority for International Application No. PCT/US2016/056867, dated Jan. 13, 2017 (11 pages).

Office Action for Chinese Application No. 201680059446.9 dated Jun. 10, 2019.

* cited by examiner

MULTILAYER COMPOSITE BACKED CARD

CROSS-REFERENCE TO RELATED APPLICATIONS

This application is a continuation of U.S. application Ser. No. 16/446,945, filed Jun. 20, 2019, which is a divisional application of U.S. application Ser. No. 15/293,137, filed Oct. 13, 2016, now U.S. Pat. No. 10,402,715, which claims a right of priority under 35 U.S.C. § 119 to U.S. provisional patent application No. 62/241,421, filed on Oct. 14, 2015. The aforementioned applications are incorporated herein by reference in their entireties.

TECHNICAL FIELD

The disclosed embodiments generally relate to transaction card constructions, and particularly, to a multilayer card construction implementing non-traditional card materials.

BACKGROUND

The term "transaction card," as used herein, refers to any physical card product that is configured to provide information, such as financial information (e.g., card numbers, account numbers, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like.

Transaction cards, such as credit and debit cards, prepaid cards, gift cards, etc., are typical means for customers to complete financial transactions. Typically, transaction cards are cast out of a plastic polymer material such as polyvinyl chloride (PVC), polycarbonate (PC), acrylonitrile butadiene styrene (ABS), or a combination of these materials. Typical credit cards may be manufactured from PVC extruded sheets that are die-cut and may include other additional overlay or print layers. The typical plastic card and its print (or overlay) layers may be modified to add functional and/or visual features. For example, a magnetic strip may be affixed to one side, electronic components may be implanted, the card may be stamped with the card number and customer name, and color or a design may be added for appearance.

Some card issuers have also begun to manufacture niche transaction cards for brand differentiation and/or to imbue their customers with cachet or provide a unique experience. These niche cards have been constructed with a look and feel of metal by implementing one or more metallic core layers such as a stainless steel or aluminum layer. The metallic core layer typically is provided with a thickness to serve as a support layer, providing rigidity or structural integrity to the transaction card. The introduction of metal as a support layer into a transaction card, however, introduces a number of practical problems. For example, the use of a core metal layer as a support layer in a transaction card may prevent the card from meeting known card standards defining flexibility and deformation or other requirements. These cards may thus be unsuitable for use with certain types of automated card readers, for example. Also, because of the prohibitive cost associated with making cards composed primarily of metal, these cards have remained niche cards available only to a limited number of users.

It is desirable to implement metals and other non-traditional card materials as a distinguishing feature of a transaction card without relying on these non-traditional materials for structural support of the transaction card. Existing manufacturing techniques, however, are not capable of incorporating these materials in a non-support layer while still meeting certain transaction card standards. For example, many desirable non-traditional materials, when constructed in a form factor of a transaction card as a non-support layer using traditional transaction card manufacturing techniques, are too brittle to meet the rigidity or durability requirements of current transaction card standards.

The present disclosure is directed to a card construction implementing non-traditional card materials that overcome one or more of the problems set forth above and/or other problems associated with conventional transaction card constructions.

SUMMARY

The disclosed embodiments relate to a transaction card comprising a card component including a non-traditional (e.g., non-plastic) card material. The card component may be a non-support component for the transaction card.

In one aspect, the present disclosure is directed to a transaction card. The transaction card may include a first card component of non-plastic material having a thickness of no more than about 0.3 mm, a second card component of composite fiber material having a thickness of no more than about 0.3 mm, and an adhesive affixing the first card component and second card component together.

In one aspect, the present disclosure is directed to a method for constructing a transaction card including steps of providing a first card component comprising non-plastic material and having a thickness of no more than about 0.3 mm, providing a second card component comprising composite fiber material and having a thickness of no more than about 0.3 mm, and affixing the first second card components together using an adhesive.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

The disclosed embodiments are directed to cards (e.g., transaction cards) including non-traditional card materials as a distinguishing feature. For purposes of this disclosure, a "non-traditional card material" refers to a non-plastic material, that is, a material excluded from a category of materials including PVC, PC, ABS or other similar plastic or thermoplastic polymers. Examples of non-traditional card materials that may be included in the disclosed cards (e.g., transaction cards) include, wood (e.g., ebony, pine, etc.), grass (e.g., bamboo), celluloid (e.g., with a tortoiseshell design), ceramics, stones (e.g., marble, granite, slate, turquoise), metals (e.g., steel, copper, aluminum, silver, gold, platinum, etc.), paper, etc. Such non-traditional card materials are desirable to differentiate a transaction card from those made of the traditional plastics so as to evoke an emotion or imbue a user with a sentiment associated with the particular chosen material. A transaction card of the disclosed embodiments may use any type of non-traditional card material or a combination of the non-traditional card materials that may provide this effect. Because a transaction card may be required to meet certain ISO/IEC 7810 standards, including requirements for size, thickness, and durability, the incorporation of non-traditional card materials in a transaction card requires use of other materials and manufacturing processes not used in traditional transaction card manufacturing.

For example, the ISO/IEC 7810 ID-1 standards for traditional banking cards require a card of a particular thickness, e.g., about 0.76 mm, to meet bending stiffness and durability and other geometric tolerance requirements. A transaction card of the disclosed embodiments may include a layer of a non-traditional card material that is a fraction of the maximum thickness of the transaction card. In some embodiments, a non-traditional card material layer may be constructed with a thickness of about 0.3 mm. Many non-traditional card materials constructed as a layer at this thickness, however, are too brittle to be used in transaction cards.

Figure 1:
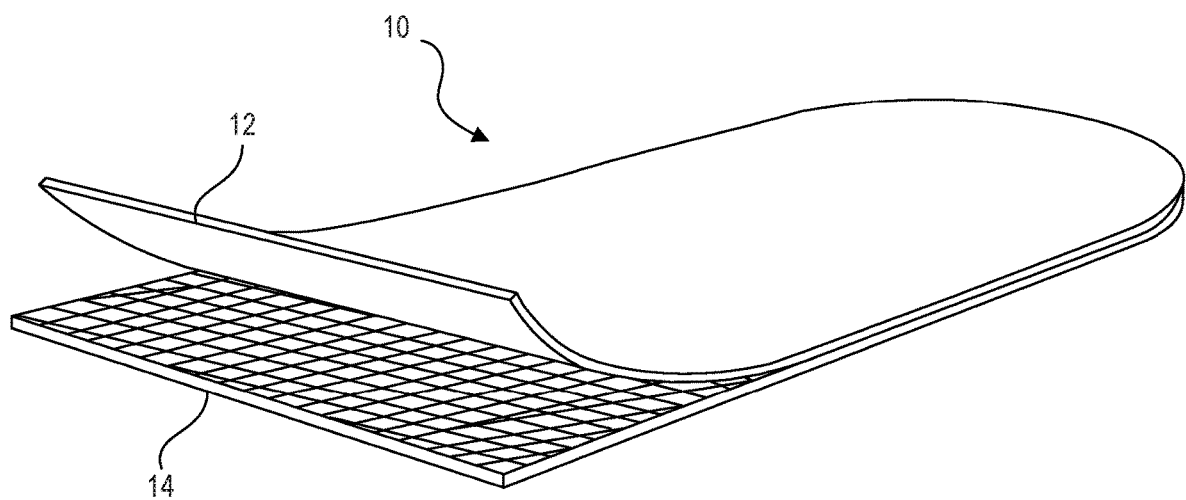
FIG. 1 is a cutaway illustration of an exemplary transaction card, consistent with disclosed embodiments.

FIG. 1 shows a transaction card 10 according to a disclosed embodiment. As shown in FIG. 1, transaction card 10 may include at least two components, or layers. Thus, "transaction card 10" may be referred to as "multilayered transaction card 10". Multilayered transaction card 10 may include a first layer 12 including a non-traditional card material. First layer 12 may be a non-support layer. That is, first layer 12 is not configured to provide significant structural integrity or support of the transaction card 10. And in some embodiments, the first layer is configured such it does not substantially contribute to the structural integrity of the card. Rather, the non-traditional card material included in first layer 12 primarily provides a distinguishing feature or aesthetic of transaction card 10. Thus, the nature and characteristics of the non-traditional card material are a prominent, perceptible feature in a finished transaction card 10.

Multilayered transaction card 10 may also include a second layer 14, having a rigidity greater than first layer 12. Second layer 14 may be referred to as a support layer or backer layer, and may include a composite material, such as a composite fiber material. "Composite fiber material" refers to a composite material that includes a combination of fibers and plastic or epoxy resin. Examples of composite fiber materials include a fiberglass composite, a glass fiber composite, a carbon fiber composite, or a natural fiber composite. Examples of natural fiber composites include composites that include one or more natural fibers, such as cellulose, hemicelluloses, pectin, and lignin. The composite fiber material may include primarily one type of fiber, or may include a mixture of two or more types of fibers.

In some embodiments, second layer 14 provides the structural integrity or support of the transaction card 10. The composite fiber material may be selected to provide desired rigidity and flexibility to meet certain ISO/IEC 7810 standards. In some embodiments, second layer 14, which may be a support layer, may include other materials, such as metal and/or paper. Paper can be included in a support layer to provide a reduced thickness, but it may not be as robust as a support layer including a composite fiber material. First layer 12 and second layer 14 may be bonded together to form transaction card 10 using any suitable adhesive or other bonding techniques that may vary based on the nature of the non-traditional card material included in the first layer 12 and the composite material included in the second layer 14.

Figure 2:
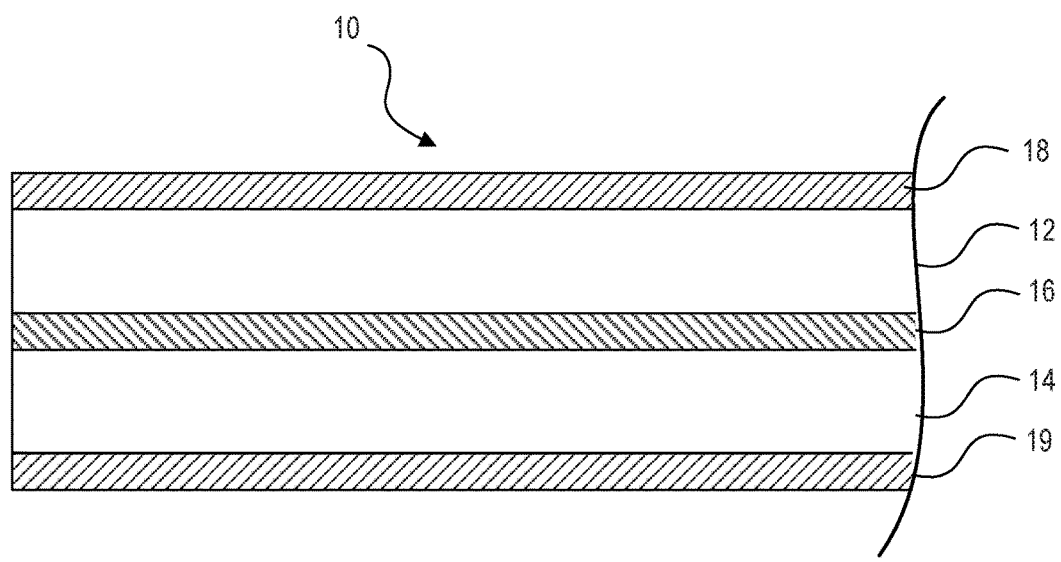
FIG. 2 is a cross-sectional illustration of an exemplary transaction card, consistent with disclosed embodiments.

FIG. 2 illustrates a cross sectional view of transaction card 10 according to a disclosed embodiment. Transaction card 10 may include first layer 12 and second layer 14. Transaction card 10 may also include one or more additional layers 16, 18, and 19, for example. Transaction card 10 may comprise an adhesive, such as adhesive layer 16, for bonding together first layer 12 with second layer 14. Any suitable adhesive may be used based on the non-traditional card material included in first layer 12. Some suitable adhesives may be of the pressure-sensitive adhesive type or a hot melt type of glue. In some embodiments the adhesive may be transparent or semitransparent. Layers 18 and 19 may be optional, and may each be a thin-film topcoat or overlay layer. Overlay layers 18 and 19 may be transparent and may function to seal transaction card 10 from environmental forces and may provide a scratch resistant or smooth layer to transaction card 10. In some embodiments, overlay layers 18 and 19 may function as a print layer or to enhance print adhesion to enable personalization options and other features to be applied to transaction card 10. Overlay layers 18 and 19 may be composed of any suitable plastic type film or lacquer used in traditional card manufacturing. Overlay layers 18 and 19 may also provide a desired surface finish or particular aesthetic for transaction card 10.

In some embodiments, though it may vary, the entire thickness of transaction card 10 is about 0.76 mm, in conformance with the applicable ISO/IEC 7810 standards. To meet this standard, the thickness of first layer 12 may be within about 0.3 mm. Second layer 14 (which may be a support layer) may also be within about 0.3 mm. The combined thickness of adhesive layer 16 and overlay layers 18 and 19 may be within about 0.16 mm. These dimensions impose challenges that are overcome through the selection of a composite material for second layer 14 that provides sufficient strength and rigidity to enable the implementation of at least one non-traditional card material in first layer 12 while preserving an aesthetic of the selected non-traditional card material.

In some embodiments, second layer 14 may include a composite fiber material that includes at least one of glass fiber, carbon fiber, nylon fiber, flax fiber, or other suitable synthetic or natural fibrous materials. Processing the composite fiber material may involve weaving the fibers, impregnating with an epoxy resin, and compressing using a vacuum or a tool under pressure. The type of fiber, length of fiber, density, and interlay of fibers selected for the composite fiber material of second layer 14 may vary depending on the characteristics of the non-traditional card material included in first layer 12. For example, when the non-traditional card material is translucent, or relatively brittle, the composite fiber material may be selected to be transparent or provide added structural integrity or support. In some embodiments, the composite fiber material is structured to meet certain ISO/IEC 7810 standards when constructed in the transaction card 10 as a whole, considering the characteristics of the selected non-traditional card material.

In some embodiments, the composite fiber material is also structured to be transparent or semitransparent such that the characteristics of the non-traditional card material included in first layer 12 are perceptible when viewed at a top and bottom surface of transaction card 10.

Transaction card 10 may be assembled using a lamination process applying pressure and/or heat to bond and seal layers 12, 14, 16, 18, and 19 together. These layers may be bonded in one or more steps using any technique that is suitable for the non-traditional card material and the adhesive applied. The lamination process may also be dictated based on different personalization options and other features to be added to transaction card 10, such as a magnetic strip, name, logo or other features. In some embodiments, a print layer or other personalization layer may be provided on one or more of the top and bottom surfaces of first layer 12 and second layer 14. Following lamination, transaction card 10 may be cut to a desired shape. In some embodiments, laser cutting may be used.

Figure 3A:
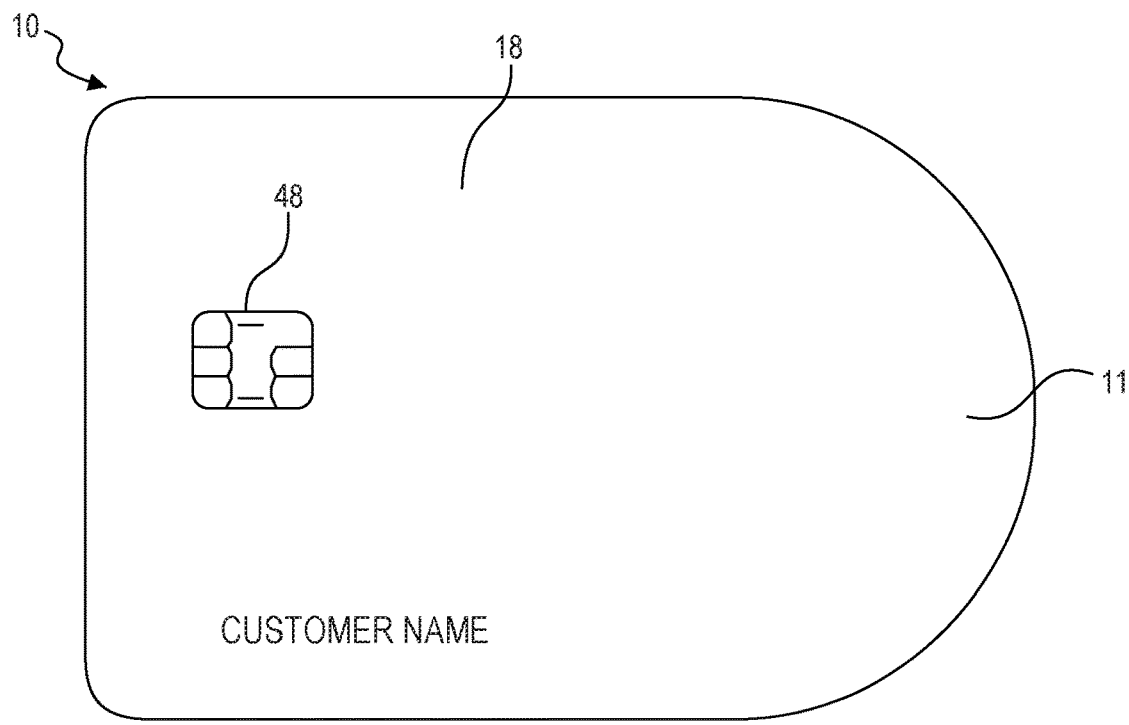
FIG. 3A is a top-view illustration of an exemplary transaction card, consistent with disclosed embodiments.
Figure 3B:
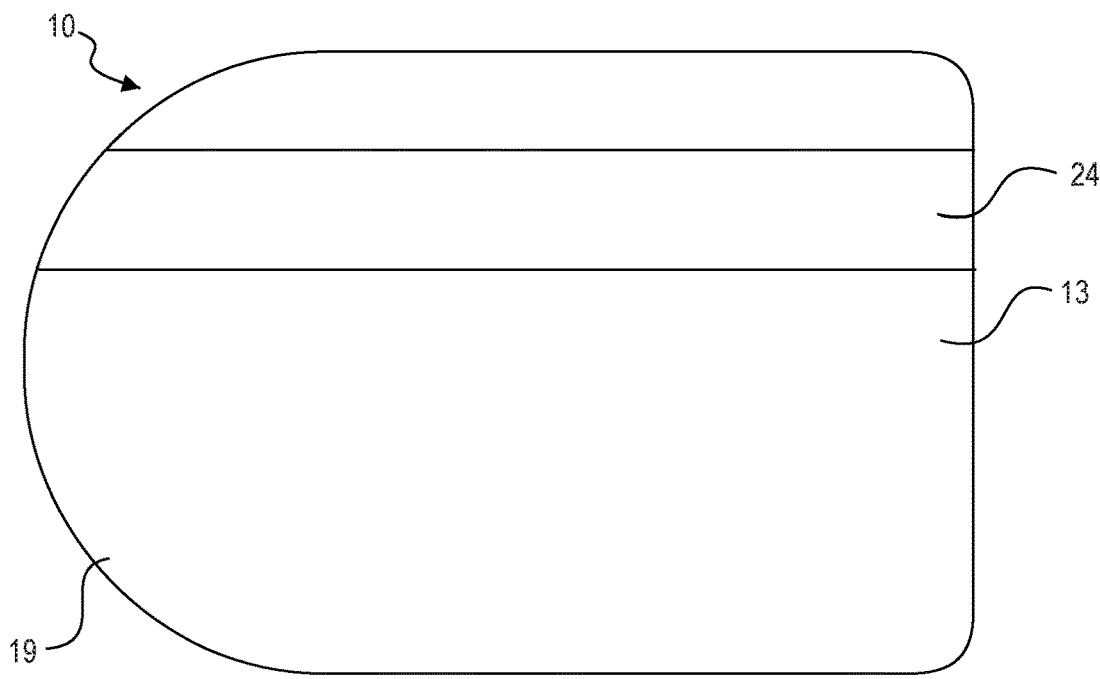
FIG. 3B is a bottom-view illustration of the exemplary transaction card of FIG. 3A.

FIG. 3A illustrates a top-view of transaction card 10 and FIG. 3B illustrates a bottom-view of transaction card 10. As shown in FIGS. 3A and 3B, transaction card 10 may include a planar first exterior surface 11 and a planar second exterior surface 13. First exterior surface 11 may be covered by overlay 18 and second exterior surface 13 may be covered by overlay layer 19. Exterior surfaces 11 and 13 may be similar in size to that of conventional transaction cards. Transaction card 10 may be configured to have any shape, such as the shape shown, or other shape selected for its ornamental or aesthetic design. On one or more of exterior surfaces 11 and 13, additional features may be visible, such as identifying information (e.g., card number, customer name, customer signature, expiration date, security code, etc.), additional information storage components (e.g., a microchip 48, a magnetic strip 24, bar codes, Quick Response ("QR") codes, etc.), visual features (e.g., colors, designs, pictures, logos, etc.), and the like. Some of these visible features may be provided or printed on external surface 11 and/or 13, or on overlay layer 18 and/or 19. These features may also be provided on or in first layer 12 or second layer 14 and visible through at least one of transparent overlay layers 18 and 19.

Some materials included in first layer 12 may be translucent when constructed with a thickness of 0.3 mm. When the non-traditional card material is translucent, a reverse printing technique may be used such that a print layer is provided between second layer 14 and first layer 12 and visible through exterior surface 11. Other techniques such as etching or engraving may also be used to provide personal information on transaction card 10 where, for example, a hammered metal or a stone is used as the non-traditional card material. Additionally, the color of an adhesive for adhesive layer 16, as well as other properties of overlay layers 18 and 19 may be selected to produce a desired aesthetic.

In some embodiments, transaction card 10 may be constructed with the personalization options and functionality to enable use and operation similar to other traditional transaction cards with the added experience enabled by the use of a non-traditional card material.

Figure 4:
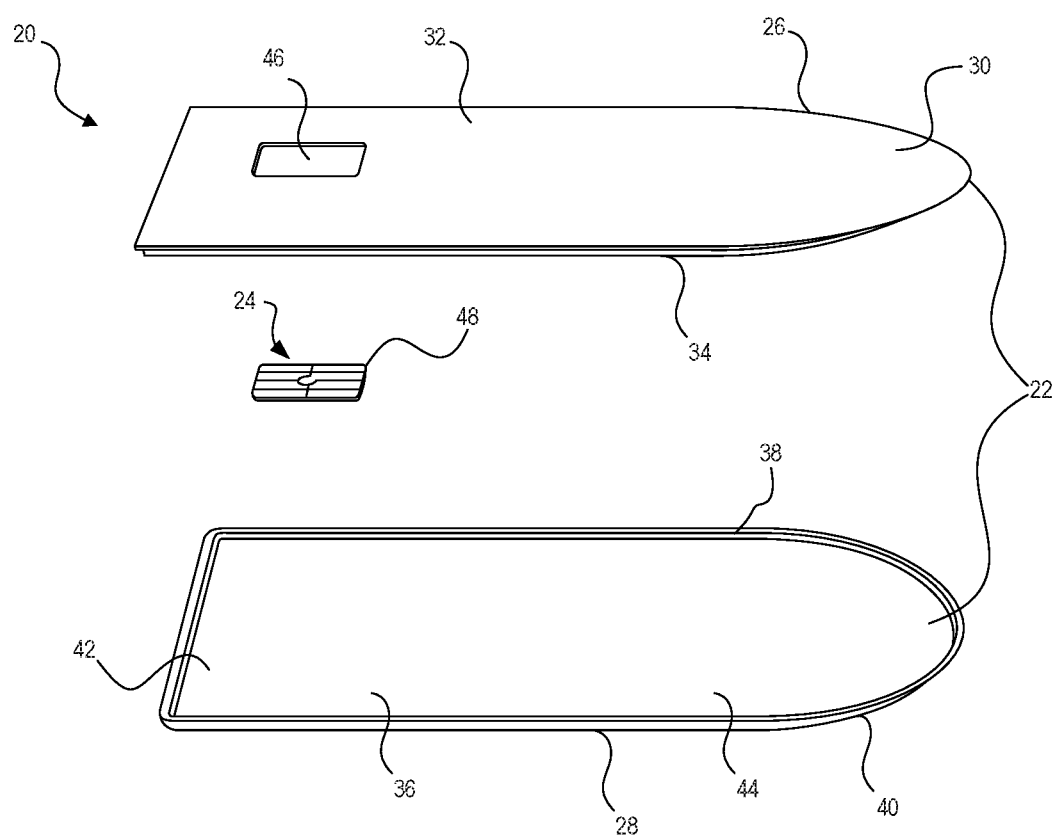
FIG. 4 is an exploded-view illustration of an exemplary transaction card, consistent with disclosed embodiments.

FIG. 4. illustrates a two-piece transaction card 20 in accordance with a disclosed embodiment. For example, the disclosed embodiments include a two-piece transaction card having two separate card components that may be independent of each other and connectable to form the transaction card. In an exemplary embodiment, transaction card 20 may include a card frame 22. Card frame 22 may include at least two separate components that are secured (e.g., attached, affixed, etc.) to each other to form transaction card 20. For example, card frame 22 may include a first, upper card component 26 that forms a first surface of transaction card 20 and a second, lower card component 28 that forms a second surface of transaction card 20. Additional components may also be included.

Various methods may be used to manufacture the separate card components with different types of materials that are suitable for satisfying certain criteria or preferences. Consistent with the disclosed embodiments, upper card component 26 may be an aesthetic component constructed with at least a non-traditional card material, and lower card component 28 may be a support component constructed with an exemplary composite fiber material. The non-traditional card materials and composite fiber materials described above for transaction card 10 may be used for transaction card 20. In addition, the construction of the separate components may allow for ease of assembly, as well as customization and the interchangeability of upper card component 26 made with different non-traditional card materials. For example, users may customize the non-traditional transaction material to be used to construct the inlay portion (e.g., upper card component 26) of the transaction cards, while a common lower card component 28 constructed of a composite fiber material is used for each of the cards. In some embodiments, users may customize the composite fiber material used to construct lower card component 28 based on the selection of the non-traditional card material for upper card component 26. In some embodiments, upper card component 26 may be constructed of a suitable composite fiber material, whereas the lower card component may be constructed from a non-traditional card material.

In some embodiments, lower card component 28 may be made of a traditional plastic card material, such as PVC, PC, ABS or other similar plastic or thermoplastic polymers. The plastic material, together with an adhesive layer, may provide support for transaction card 20 when the inlay material (i.e., the non-traditional card material used in the inlay portion, such as upper card component 26) has a sufficient strength.

Upper card component 26 and lower card component 28 may be manufactured using a process suitable for the selected materials. In an exemplary embodiment, upper card component 26 may be manufactured using processes such as milling, grinding, sanding, hammering, injection molding, compression molding, and the like, which may be suitable for a selected non-traditional card material. Lower card component 28 may also be manufactured using a process suitable for the selected composite fiber material. In an exemplary embodiment, lower card component 28 may be constructed using suitable composite fiber material manufacturing processes, such as injection molding, compression molding, milling, etc.

In transaction card 20 shown in FIG. 4, upper card component 26 and lower card component 28 are separable and independent card components. For example, in one embodiment, lower card component 28 may form a cavity 44 (shown in FIG. 4) and upper card component 26 may form an inlay component configured to be seated within cavity 44. In some embodiments, upper card component 26 may be pressed or inserted into cavity 44 formed in lower card component 28, and may be secured therein. Other suitable configurations can also be used. For example, transaction card 20 may include a bucket-and-lid construction in which lower card component 28 forms a container and upper card component 26 forms a lid for the container that rests on a rim of lower card component 28.

In an exemplary embodiment, upper card component 26 may include a top surface 30 that defines a first side of transaction card 20. Top surface 30 may form a first exterior surface 32 of transaction card 20. In addition, upper card component 26 may include a bottom surface 34 that forms a first interior surface (bottom surface 34 is also referred to as first interior surface 34). Upper card component 26 may be a solid component including a generally constant thickness. In other embodiments, upper card component 26 may include other features, such as a beveled edge, support flange, hollow center, etc.

In an exemplary embodiment, lower card component 28 may include a base portion 36 and a projecting wall 38. Base portion 36 may define a second side of transaction card 20. For example, a bottom surface of base portion 36 may form a second exterior surface 40 of transaction card 20. In addition, a top surface of base portion 36 may form a second interior surface 42. Projecting wall 38 may extend away from base portion 36 at the circumference of base portion 36. The height of projecting wall 38 defines at least a portion of the thickness of transaction card 20. Base portion 36 and projecting wall 38 may together define a cavity 44 for receiving upper card component 26.

Upper card component 26 and lower card component 28 may be securable to each other to form transaction card 20. For example, upper card component 26 may be placed in (e.g., pressed into) cavity 44 such that upper card component 26 forms an inlay component within a shell formed by lower card component 28. In some embodiments, upper card component 26 may be pressed into cavity 44 and secured by projecting wall 38. In some embodiments, a space may be formed between upper card component 26 and lower card component 28, even after the two are joined to each other. This space may accommodate additional features, such as electronic component 24. Upper card component 26 and lower card component 28 may be permanently or temporarily secured to each other to form card frame 22. For example, upper card component 26 may be secured to lower card component 28 using an adhesive, overmolding, pressure fit, interference fit, clasp, tongue-in-groove, post-and-hole, etc. Upper card component 26 and lower card component 28 may be temporarily secured to each other through an attachment feature (e.g., for hinged attachment, sliding attachment, etc.), which may allow card frame 22 to be disassembled.

Transaction card 20 may further include electronic component 24. As used herein, an "electronic component" may be one or more devices and/or elements configured to receive, store, process, provide, transfer, send, delete, and/or generate information, such as data and/or signals. For example, electronic component 24 may be a microchip 48 (e.g., Europay, MasterCard, and Visa ("EMV") chip), a communication device (e.g., near field communication ("NFC") antenna, Bluetooth® device, WiFi device), etc. Electronic component 24 may be secured to card frame 22 in such a way that allows card frame 22 to carry electronic component 24 while maintaining a utility of electronic component 24 (i.e., allowing electronic component 24 to interact with a payment terminal or other transaction card specific terminal). In some embodiments, electronic component 24 may be sandwiched between upper card component 26 and lower card component 28 within a space formed between upper card component 26 and lower card component 28. For example, electronic component 24 including an NFC antenna may be placed in cavity 44 before upper card component 26 is placed therein. In some embodiments, electronic components 24 may be embedded in an adhesive material that is used to bond upper card component 26 to lower card component 28. In some embodiments, upper card component 26 may include an opening 46 configured for receiving electronic component 24. For example, upper card component 26 may include opening 46 for receiving an EMV chip 48. In this way, EMV chip 48 may be substantially flush with first exterior surface 32.

In some embodiments, EMV chip 48 may be located in a space between upper card component 26 and lower card component 28 and a contact member may be disposed in opening 46. For example, opening 46 may include a plurality of openings that each include a conductive member, each conductive member being in contact with EMV chip 48 located in the space between upper card component 26 and lower card component 28. The conductive members create a plurality of contacts that are substantially flush with first exterior surface 32.

Figure 5:
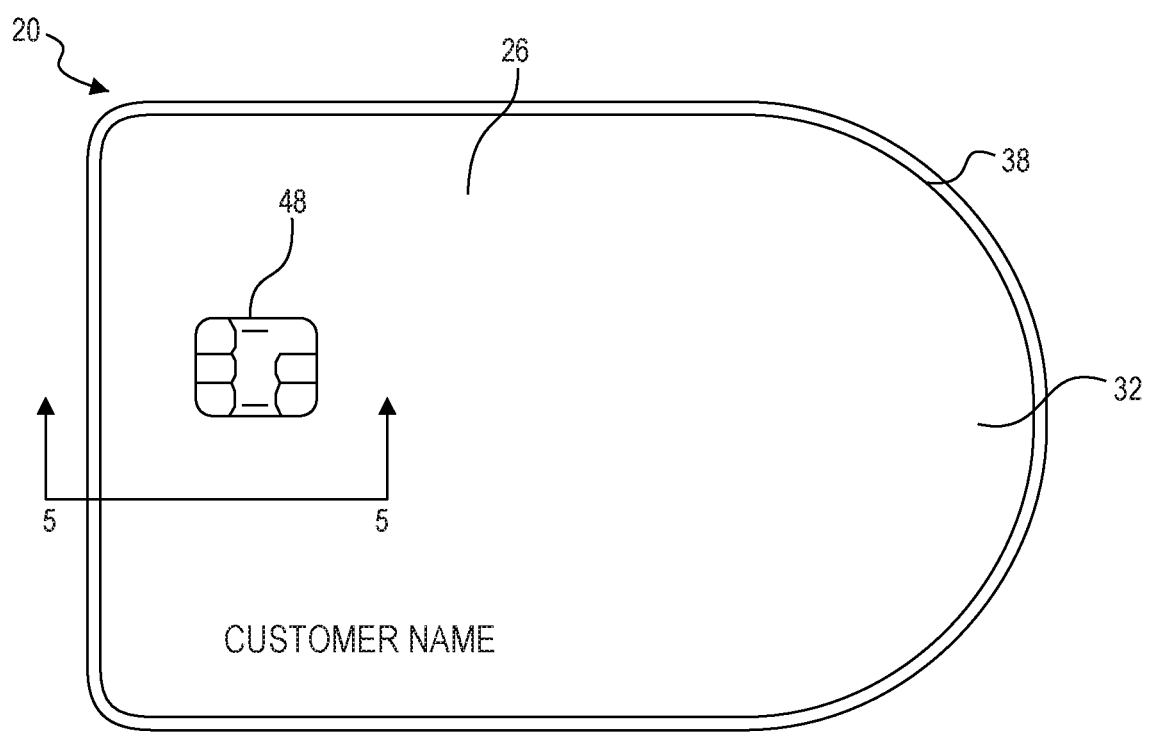
FIG. 5 is a top-view illustration of the exemplary transaction card of FIG. 4.

FIG. 5 illustrates a top view of transaction card 20 according to a disclosed embodiment. As shown in FIG. 5, upper card component 26 functions as an inlay such that projecting wall 38 of lower card component 28 forms a perimeter of transaction card 20.

Figure 6:
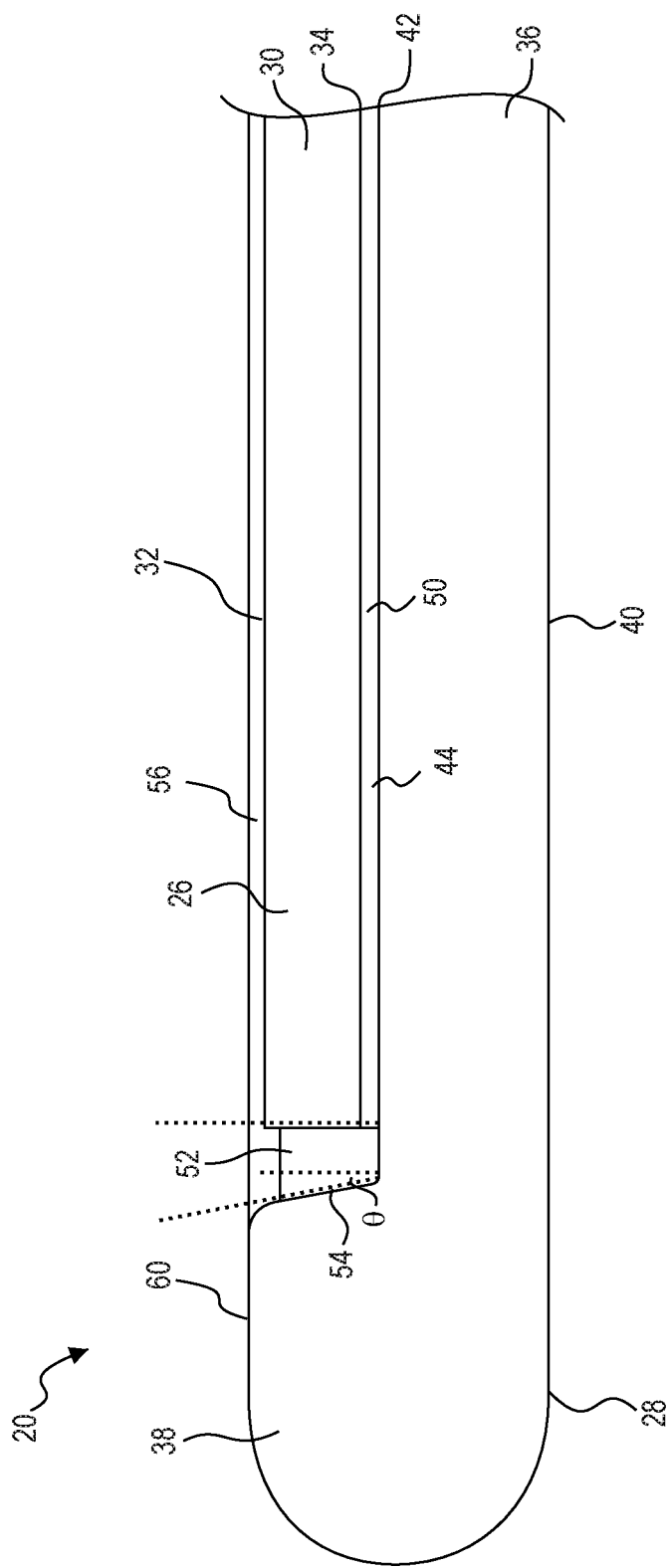
FIG. 6 is a cross-sectional illustration taken along line 5-5 of FIG. 5, consistent with disclosed embodiments.

FIG. 6 illustrates a cross-sectional view of assembled transaction card 20, taken along line 5-5 of FIG. 5. As shown, upper card component 26 may be positioned in cavity 44 of lower card component 28. An adhesive, such as adhesive layer 50, may be placed between first interior surface 34 and second interior surface 42 to adhere top wall 30 to bottom wall 36. In this way, upper card component 26 may be secured (e.g., bonded) to lower card component 28 through adhesive layer 50. Adhesive layer 50 may include any suitable adhesive material, such as a hot melt adhesive, pressure-sensitive adhesive, etc. Other means of attaching upper card component 26 to lower card component 28 may be used. For example, in some embodiments, upper card component 26 may be insert molded into lower card component 28. For example, lower card component 28 may be injection molded around upper card component 26.

In some embodiments, electronic component 24 may be positioned between first interior surface 34 and second interior surface 42. For example, electronic component 24 (e.g., an NFC antenna, radio frequency communication device, etc.) may be embedded in adhesive layer 50. In other embodiments, one or more electronic components 24 may be positioned between adhesive layer 50 and at least one of first interior surface 34 and second interior surface 42 (e.g., with a second adhesive layer interposed between the contacted surfaces). In other embodiments, one or more electronic components 24 may be embedded within upper card component 26 and/or lower card component 28. In the embodiment of FIG. 4, EMV chip 48 may be secured to second interior surface 42 via adhesive layer 50.

As shown in FIG. 6, a thickness of projecting wall 38 may define the thickness of transaction card 20. Cavity 44 formed by projecting wall 38 may include a height that is the same as or slightly greater than the thickness of upper card component 26. In one exemplary embodiment, the thickness of transaction card 20 may be less than approximately 2 mm, which may be within a thickness range for transaction card 20 configured for contactless payments, for example. In another exemplary embodiment, the thickness of transaction card 20 may be less than approximately 1 mm. For example, projecting wall 38 may define a thickness of approximately 0.76 mm. Transaction card 20 may include any other suitable thickness. In some embodiments, projecting wall 38 may define a rounded edge. Base portion 36 may include a thickness that is approximately one half of the thickness of projecting wall 38. For example, base portion 36 may include a thickness in a range of approximately 0.3-0.4 mm.

With upper card component 26 positioned in cavity 44 of lower card component 28, a gap 52 may be formed around a perimeter thereof, between a side wall of upper card component 26 and an inner side of projecting wall 38. Gap 52 may provide a space for expansion and/or contraction of upper card component 26 and/or lower card component 28. Gap 52 may also allow for ease of removal of upper card component 26 from lower card component 28. In an exemplary embodiment, gap 52 may be approximately 0.15 mm wide. In addition, the inner side of projecting wall 38 may slope at an angle θ away from the side wall of upper card component 26. The slope of the inner side of projecting wall 38 may help guide insertion of upper card component 26 into cavity 44. The angle θ may be approximately 5 degrees, 10 degrees, 15 degrees, or any other suitable angle. Gap 52 may additionally or alternatively be an aesthetic element of the ornamental design of transaction card 20.

Upper card component 26 may be positioned in cavity 44 such that first exterior surface 32 is at or below a top surface 60 of projecting wall 38. For example, upper card component 26 may be thinner than a depth of cavity 44 such that upper card component 26 sits below flush by a space 56. In an exemplary embodiment, upper card component 26 may include a thickness of approximately 0.30 mm, such that space 56 is approximately 0.05 mm high. In other embodiments, top surface 30 may be flush with a top of projecting wall 38 or top wall (or a portion thereof) may extend above top surface 60 of projecting wall 38. In embodiments that include adhesive layer 50, the total thickness of upper card component 26 and adhesive layer 50 may be approximately 0.30 mm. Additional overlay layers, similar to overlay layers 18 and 19 shown in FIG. 2, may also be applied to seal transaction card 20, providing a protective coating or other aesthetic finish, and to enable customization of personalization options or other features.

While illustrative embodiments have been described herein, the scope includes any and all embodiments having equivalent elements, modifications, omissions, combinations (e.g., of aspects across various embodiments), adaptations or alterations based on the present disclosure.

The elements in the claims are to be interpreted broadly based on the language employed in the claims and not limited to examples described in the present specification or during the prosecution of the application, which examples are to be construed as non-exclusive. It is intended, therefore, that the specification and examples be considered as examples only, with a true scope and spirit being indicated by the following claims and their full scope of equivalents.

What is claimed is:

1. A transaction card comprising:
a first card component of non-plastic material;
a second card component of composite fiber material, wherein the composite fiber material comprises a combination of fibers and at least one of plastic of epoxy resin, the second card component having a rigidity greater than the first card component; and
an adhesive affixing the first card component directly to the second card component.

2. The transaction card of claim 1, wherein the first card component has a thickness of about 0.3 mm.

3. The transaction card of claim 1, wherein the second card component has a thickness of about 0.3 mm.

4. The transaction card of claim 1, wherein the composite fiber material comprises at least one of: a glass fiber composite, a carbon fiber composite, or a natural fiber composite.

5. The transaction card of claim 1, wherein the non-plastic material comprises at least one of: a wood material, a grass material, a celluloid material, a ceramic material, a stone material, or a metal material.

6. The transaction card of claim 1, wherein the non-plastic material is translucent.

7. The transaction card of claim 1, wherein the composite fiber material comprises at least one of a glass, carbon, or natural fiber material in combination with at least of a plastic or epoxy resin.

8. The transaction card of claim 1, wherein:
the first card component comprises a first surface; and
the second card component comprises a second surface and a wall defining a cavity,
wherein the first card component is insertable into the cavity, the first surface forming a first exterior surface and the second surface forming a second exterior surface when the first card component is in the cavity.

9. The transaction card of claim 8, wherein:
the first card component comprises an inlay component including the first surface and a third surface;
the second card component comprises a container component comprising a base portion comprising the second surface and a fourth surface; and
the wall comprises a projecting wall extending from the base portion and defining the cavity.

10. The transaction card of claim 9, wherein the adhesive attaches the third surface to the fourth surface.

11. The transaction card of claim 1, wherein the transaction card has a total thickness of about 0.76 mm.

12. The transaction card of claim 1, further comprising:
an electronic component disposed between the first card component and second card component.

13. The transaction card of claim 12, wherein the electronic component comprises a communication device.

14. The transaction card of claim 12, wherein the electronic component comprises a microchip.

15. The transaction card of claim 14, wherein:
the first card component further comprises an opening; and
the opening exposes a contact element of the electronic component.

16. The transaction card of claim 15, wherein:
the first card component comprises a first surface and a second surface, the second surface being affixed to second card component and the first surface forming an exterior surface of the transaction card.

17. The transaction card of claim 16, wherein the contact element of the electronic component is substantially flush with the first surface.

18. The transaction card of claim 1, wherein the transaction card comprises a financial transaction card.

19. The transaction card of claim 18, wherein the financial transaction card has a rigidity meeting or exceeding ISO/IEC 7810 ID-1 standards for rigidity.

20. The transaction card of claim 1, wherein the transaction card comprises an identification card.

* * * * *

UNITED STATES PATENT AND TRADEMARK OFFICE
CERTIFICATE OF CORRECTION

| | |
|---|---|
| PATENT NO. | : 11,436,463 B2 |
| APPLICATION NO. | : 17/175123 |
| DATED | : September 6, 2022 |
| INVENTOR(S) | : Carl Alexander Cepress et al. |

It is certified that error appears in the above-identified patent and that said Letters Patent is hereby corrected as shown below:

In the Claims

Claim 7, Column 10, Line 28, "least of" should read as --least one of--.

Signed and Sealed this
Twenty-fourth Day of January, 2023

Katherine Kelly Vidal
*Director of the United States Patent and Trademark Office*